(12) United States Patent
Selby

(10) Patent No.: US 7,014,266 B2
(45) Date of Patent: Mar. 21, 2006

(54) KNEELER SEAT

(76) Inventor: William J. Selby, 1530 West Dr., Stoughton, MA (US) 02072

( * ) Notice: Subject to any disclaimer, the term of this patent is extended or adjusted under 35 U.S.C. 154(b) by 87 days.

(21) Appl. No.: 10/841,733

(22) Filed: May 7, 2004

(65) Prior Publication Data
US 2005/0264079 A1   Dec. 1, 2005

(51) Int. Cl.
*A47C 16/04* (2006.01)
(52) U.S. Cl. ............... 297/423.16; 297/423.11; 297/440.14; 297/3; 108/158.12; 108/159.11; 182/230
(58) Field of Classification Search .......... 297/3, 297/423.39, 423.12, 423.41, 423.16, 423.14, 297/440.1, 440.14; 248/165, 440.1, 460; 108/157.16, 158.12, 159.11, 153.1; 182/230
See application file for complete search history.

(56) References Cited

U.S. PATENT DOCUMENTS

| | | | | |
|---|---|---|---|---|
| 830,103 A | * | 9/1906 | Rundell | 297/423.11 |
| 2,793,679 A | * | 5/1957 | Layne | 297/3 |
| 2,829,705 A | * | 4/1958 | Godshalk et al. | 297/2 |
| 4,618,183 A | * | 10/1986 | Bauer | 297/3 |
| 4,763,756 A | * | 8/1988 | Horan | 182/230 |
| 4,798,264 A | * | 1/1989 | Miller et al. | 182/230 |

* cited by examiner

*Primary Examiner*—Anthony D. Barfield
(74) *Attorney, Agent, or Firm*—Steven N. Fox, Esq.

(57) ABSTRACT

The present invention is a kneeler seat for use in the kneeling or sitting position. The kneeler seat comprises first and second leg members each having first and second end portions and a seat engagement portion disposed substantially closer to the first end portion than the second end portion. Each of the seat engagement portion comprise an elongated cavity having upper and lower surfaces and first and second side surfaces. Each of the seat engagement portions further comprises first and second guide and retention channels formed in the upper and lower surfaces of the elongated cavity, respectively. The first and second guide and retention channels are aligned and disposed parallel to and between the first and second sidewalls. The seat member comprises first and second plugs engageable with the seat engagement portions of the first and second leg members, respectively. Each of the first and second plugs comprises a base portion and first and second walls extending outward from said base portion. The first and second plugs further comprise first and second guide and retention members protruding from opposite sides of the base portion. The first and second plugs may further comprise a stop member to prevent disengagement from the first and second leg members.

1 Claim, 9 Drawing Sheets

KNEELER SEAT

FIELD OF THE INVENTION

The present invention relates to kneeler seats.

BACKGROUND OF THE INVENTION

Kneeler seats have been used for many years to provide support when a person is kneeling, as is commonly performed when gardening. Conventional kneeler seats are expensive to manufacture and difficult to assemble which may cause unsafe use by the consumer. There is a continuing need to develop a kneeler seat that is less costly to manufacture and easier to assemble by the consumer for safe use.

SUMMARY OF THE INVENTION

The present invention is a kneeler seat generally comprising a plastic hollow seat that can be removably securely to a pair of plastic hollow leg support members. The design of the seat and first and second leg supports and their assembly and disassembly provides a kneeler seat which is less costly to manufacture and easy to assemble by the consumer for safe use.

BRIEF DESCRIPTION OF THE DRAWINGS

The following detailed description of the invention will be more fully understood with reference to the accompanying drawings in which.

DETAILED DESCRIPTION OF THE PREFERRED EMBODIMENTS

Referring to FIGS. 1–9, the present invention is a kneeler seat 10 generally comprising first and second leg members 12 and 14, and a seat member 16.

Figure 1:
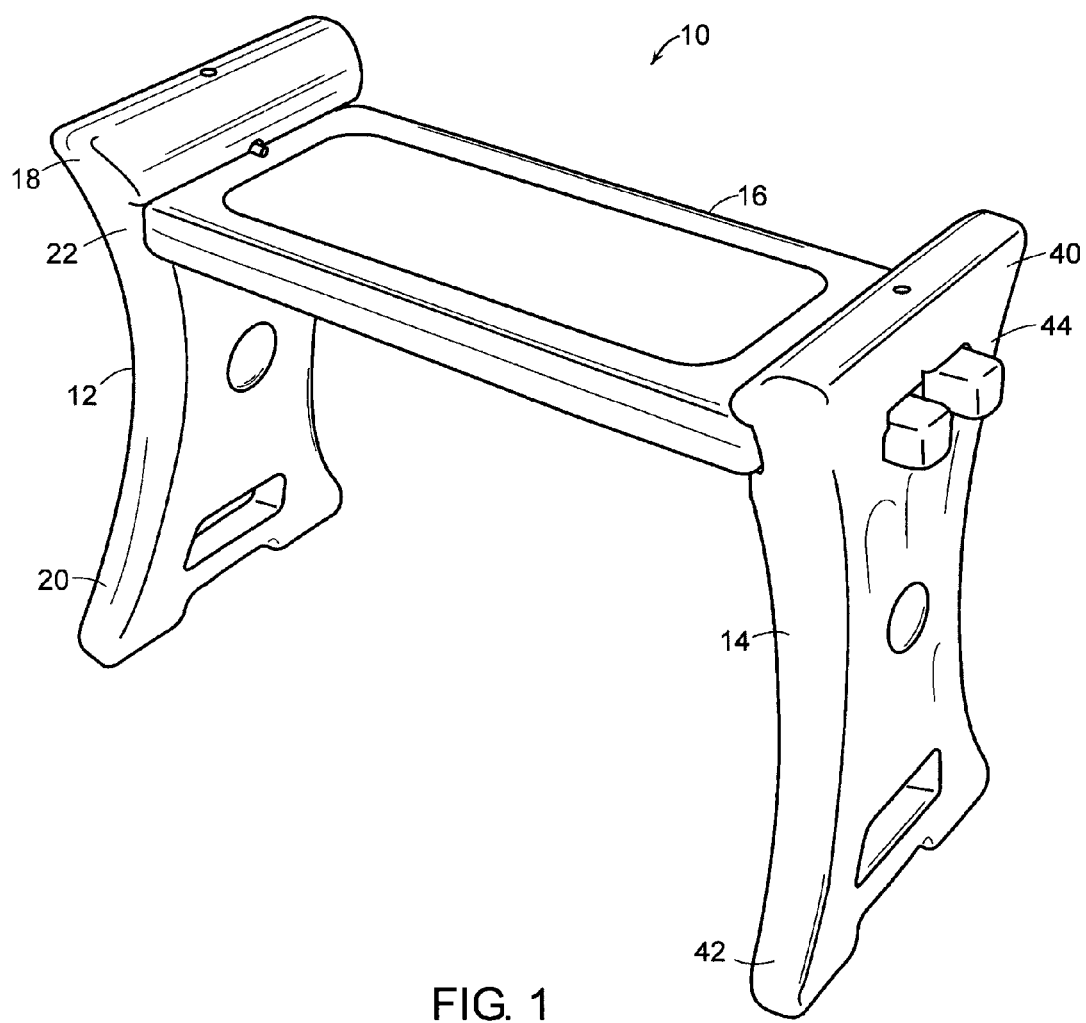
FIGS. 1 and 2 are perspective views of the kneeler seat of the present invention.
Figure 2:
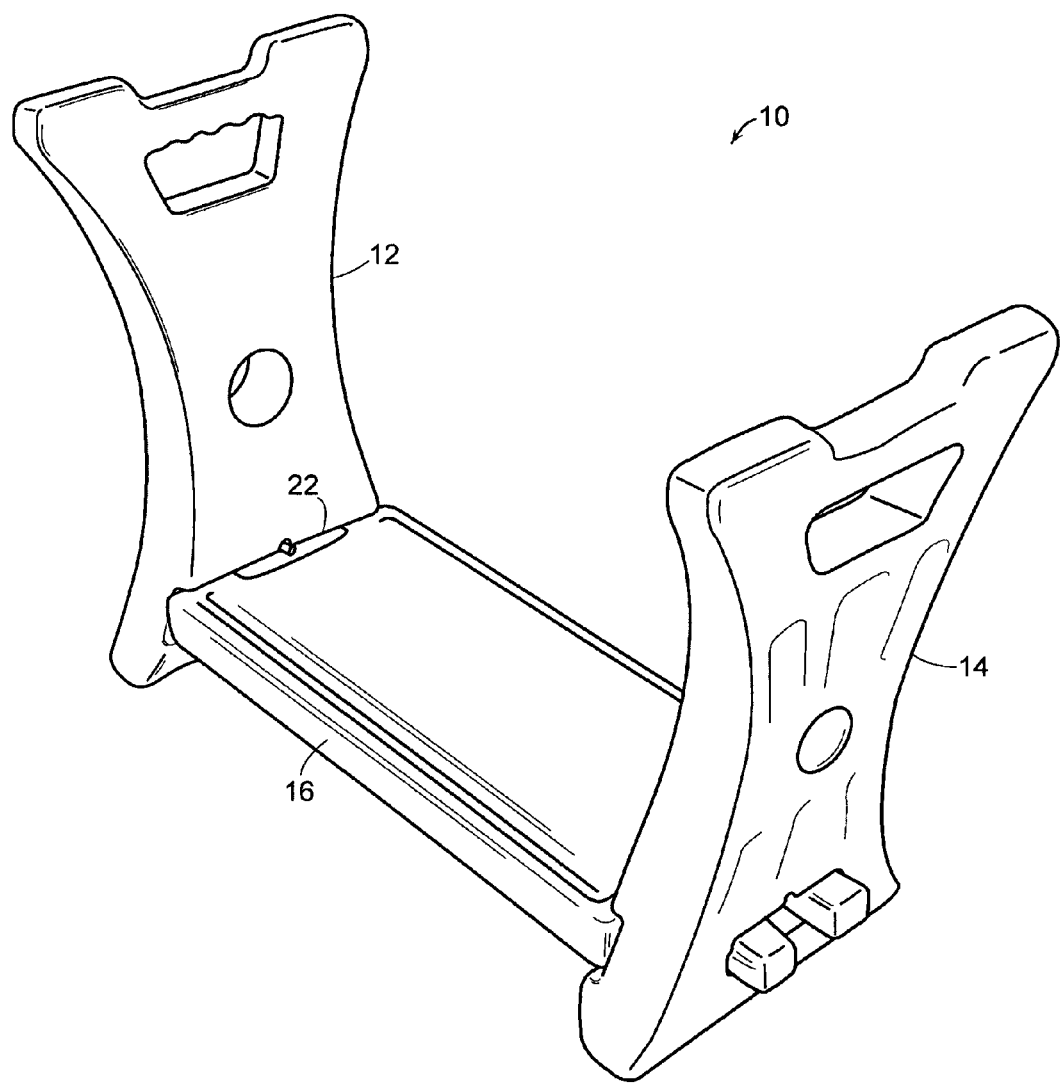
Figure 3:
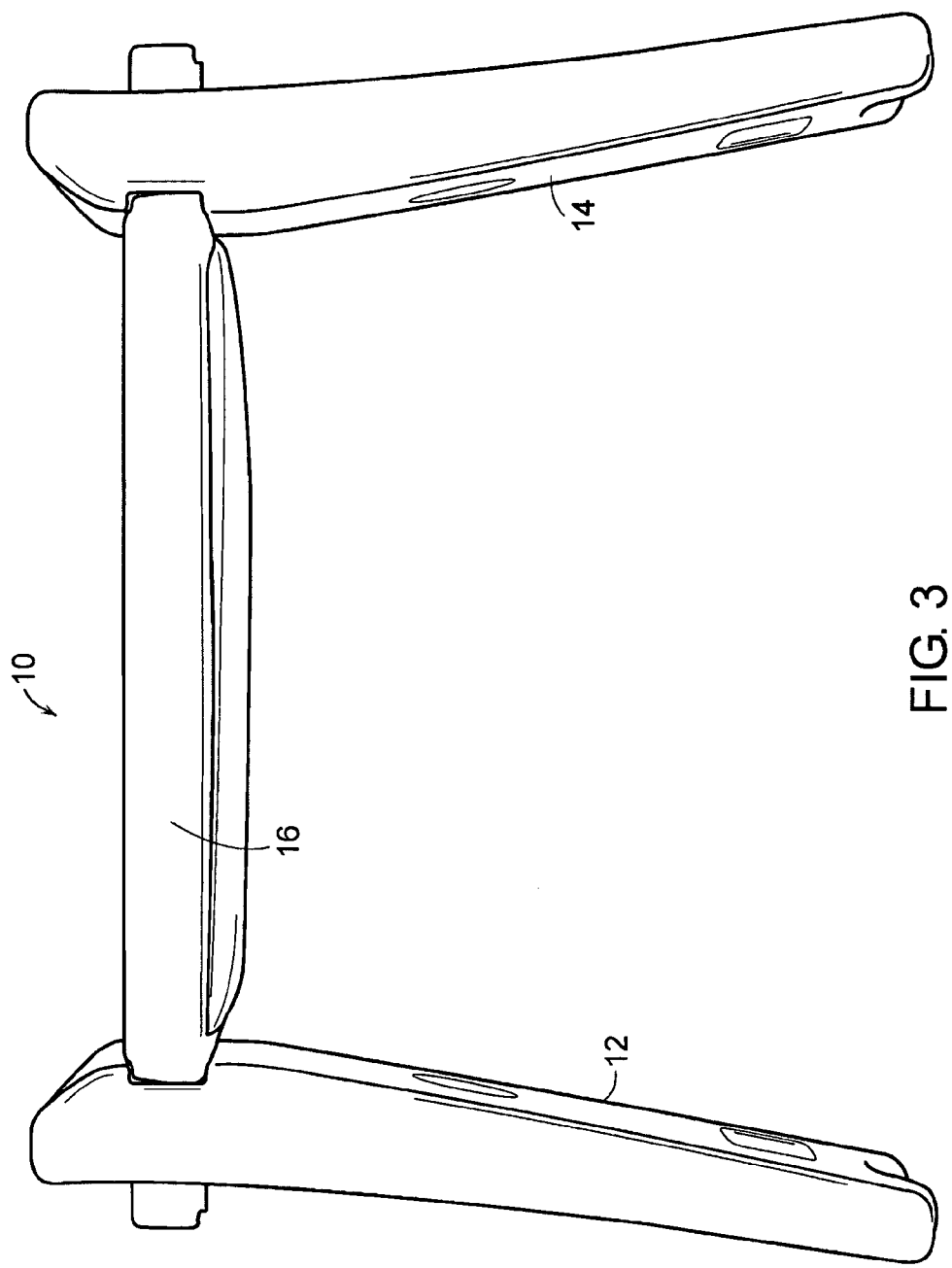
FIG. 3 is a front view of the present invention.
Figure 4:
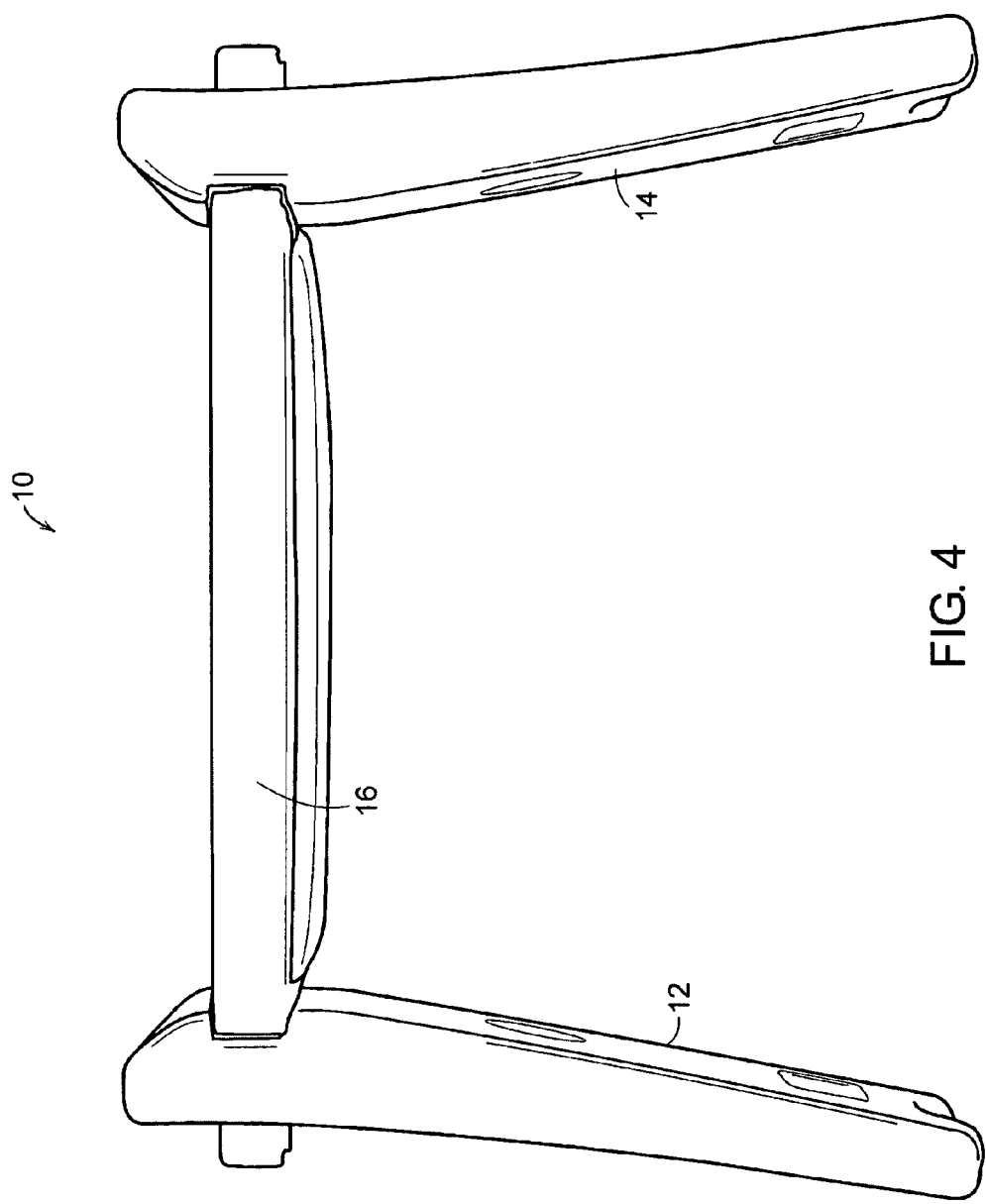
FIG. 4 is a rear view of the present invention.
Figure 5:
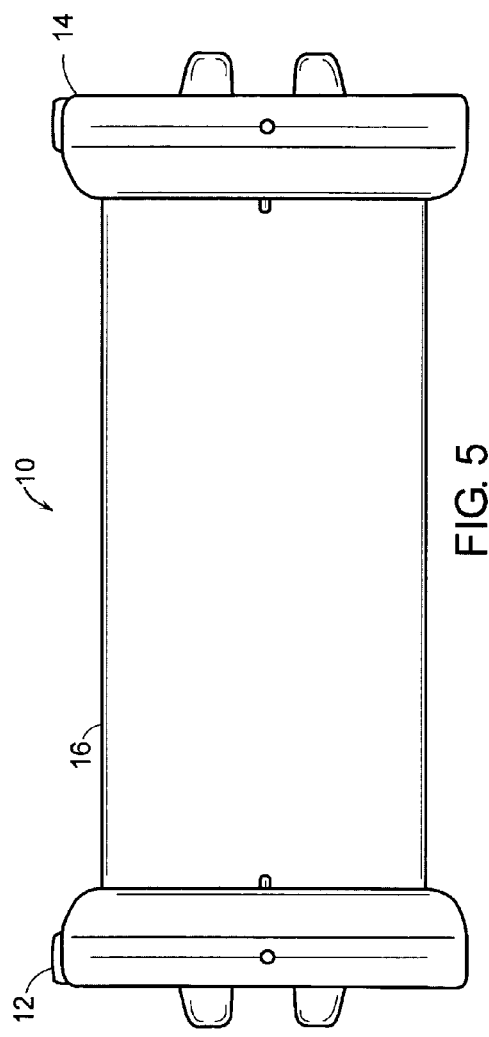
FIGS. 5 and 6 are bottom and top views, respectively, of the present invention.
Figure 6:
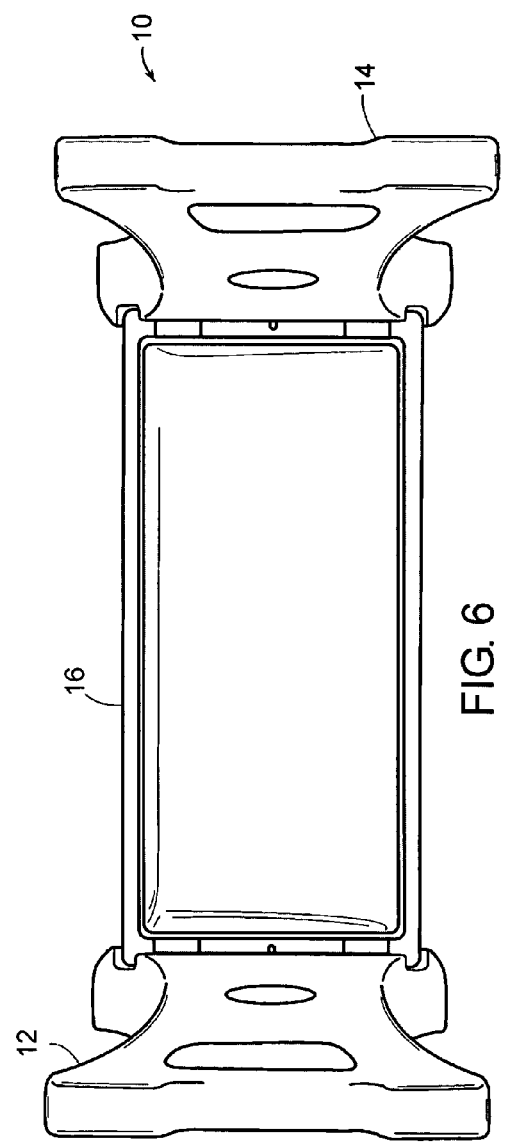
Figure 8:
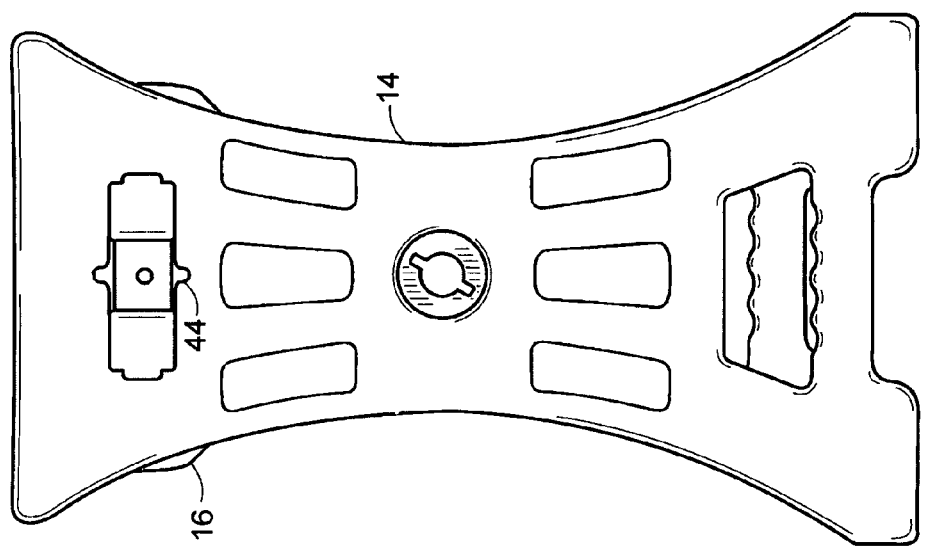
FIGS. 7 and 8 are side views, respectively, of the present invention.
Figure 7:
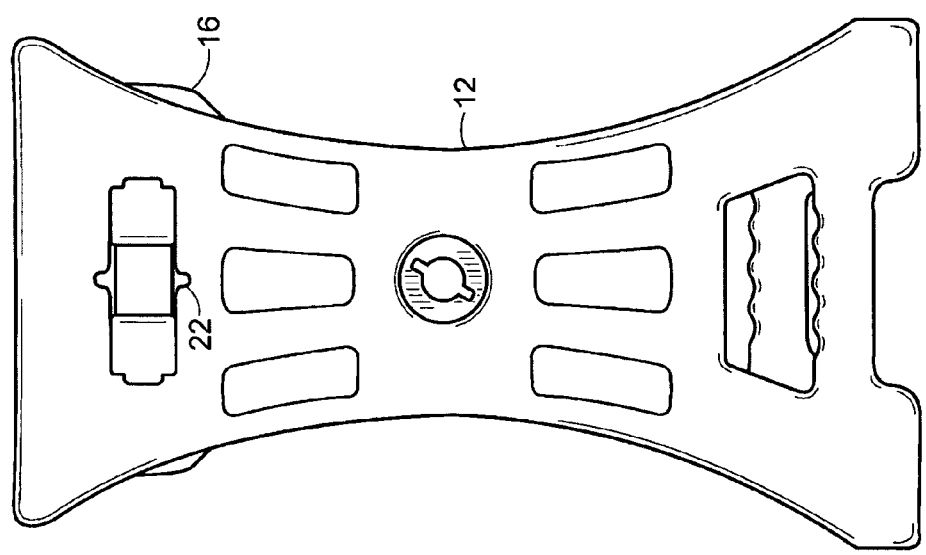
Figure 9:
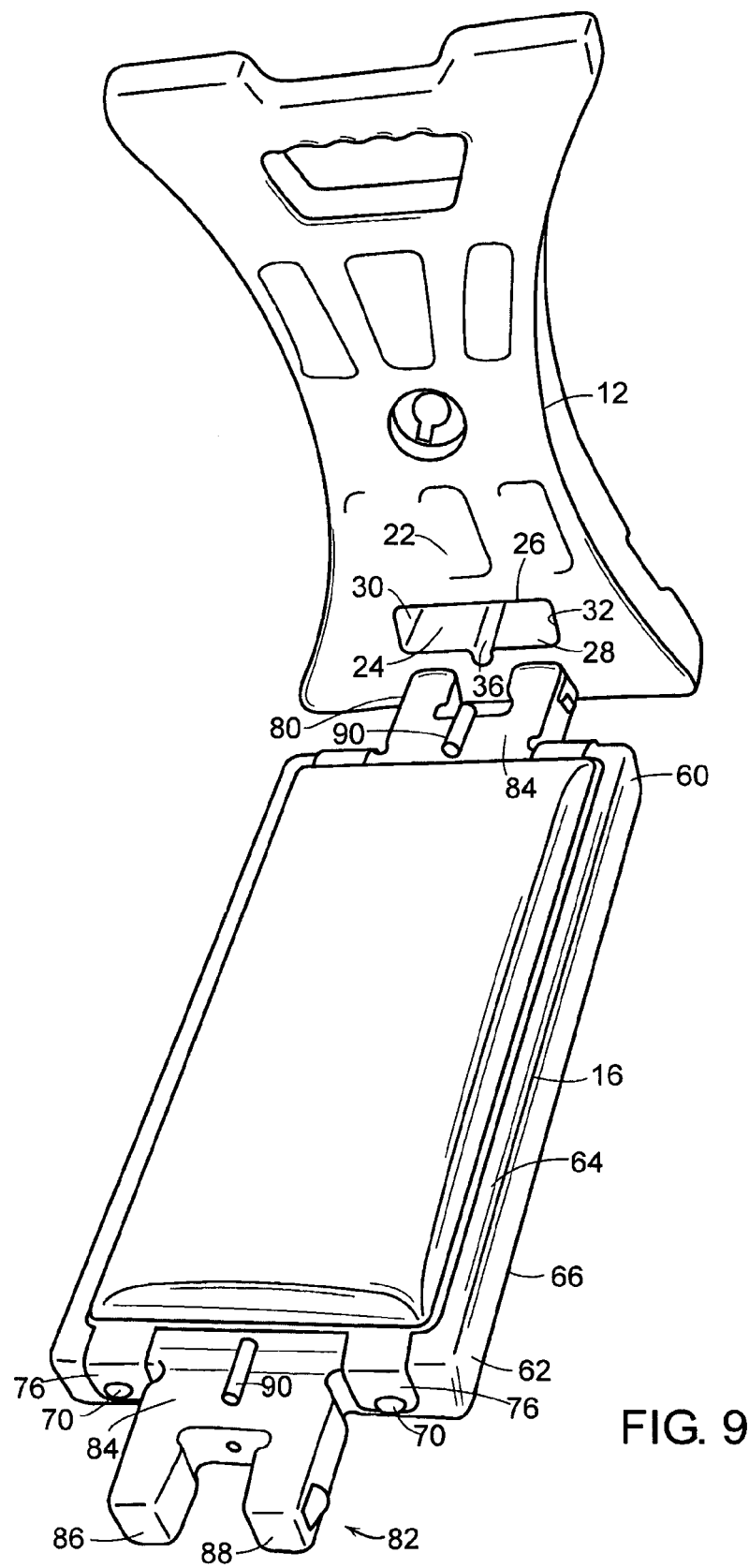
FIG. 9 is a exploded view of a portion of the present invention.
Figure 10:
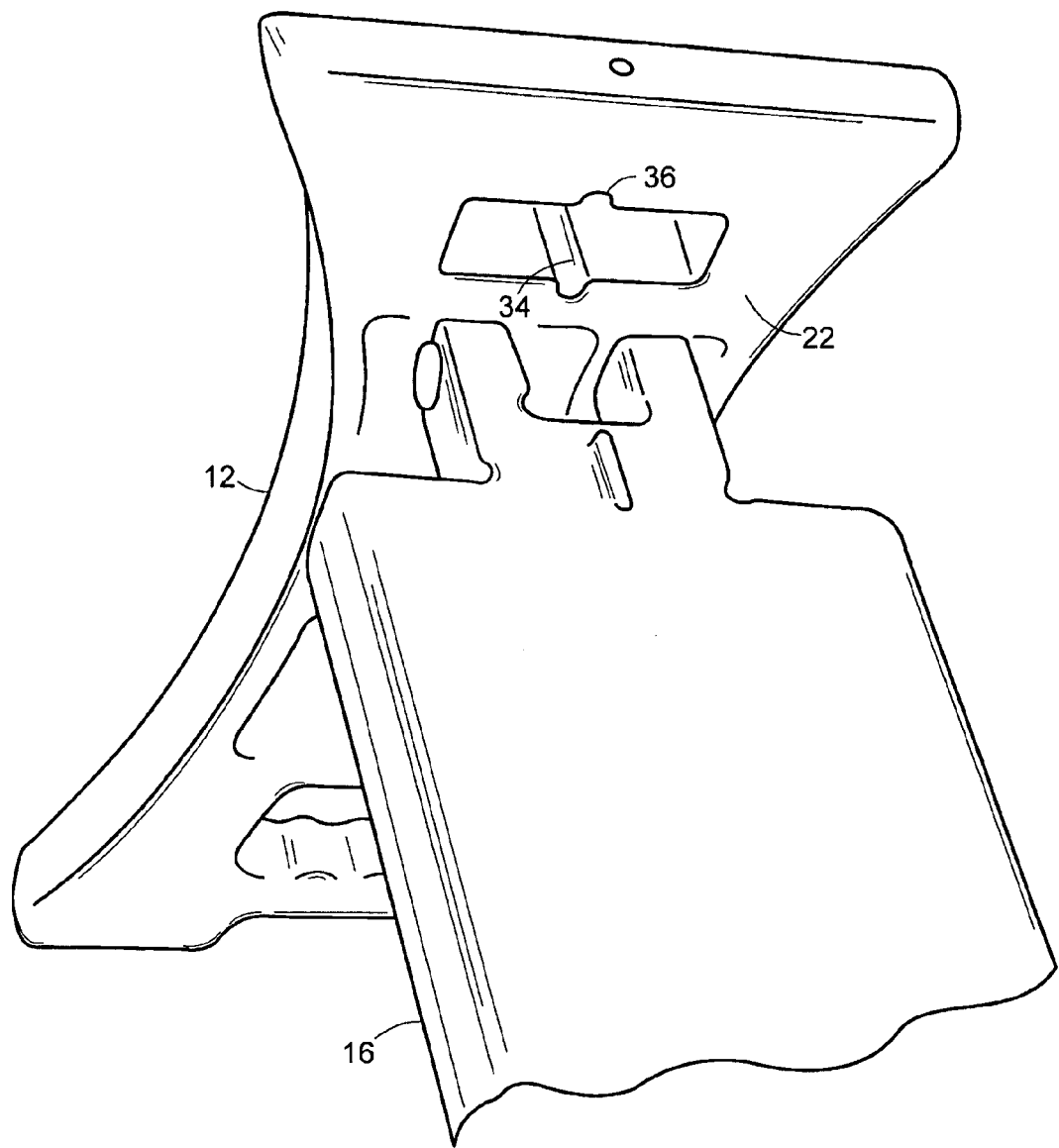
Figure 11:
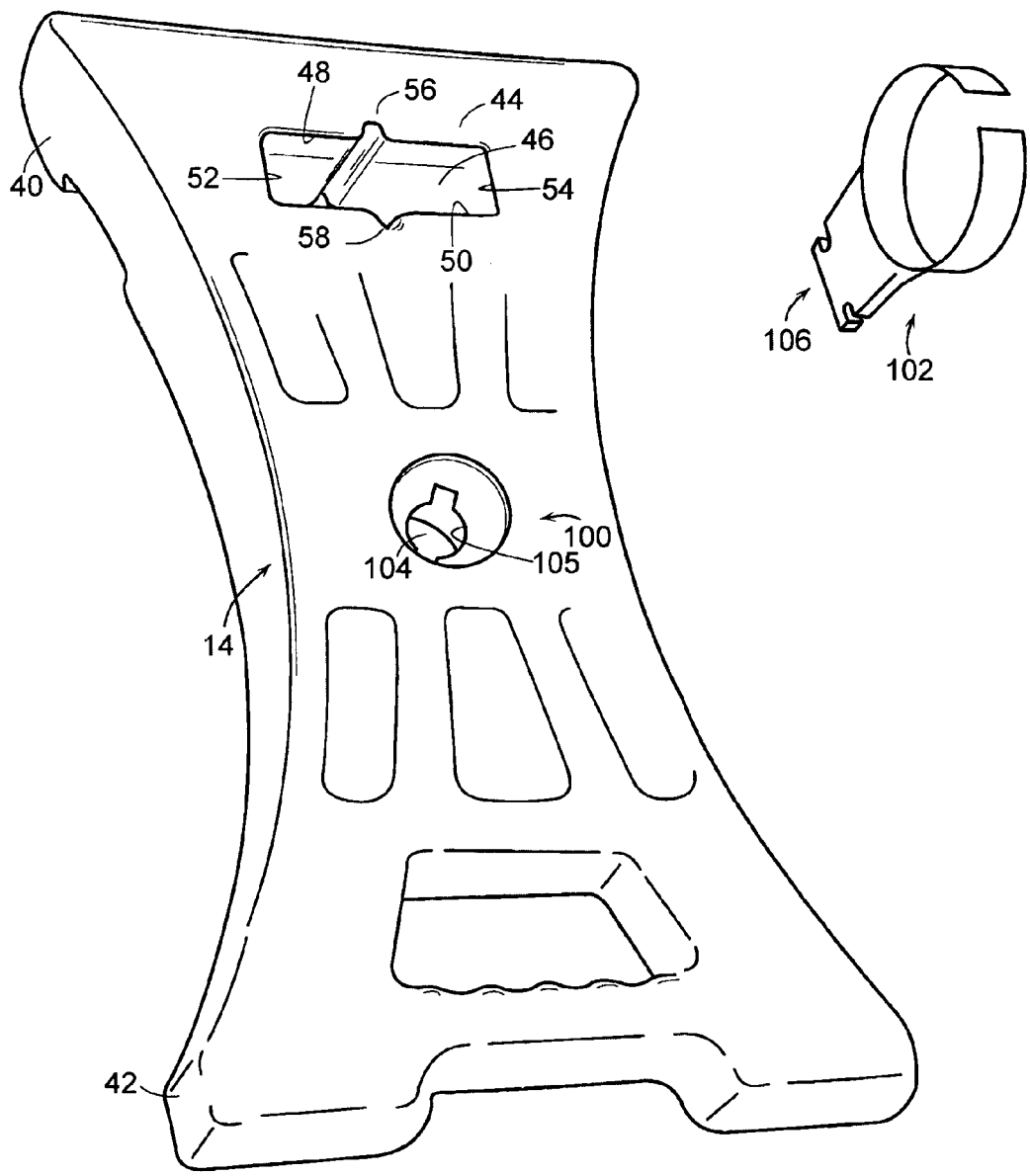

The first leg member 12 comprises first and second end portions 18 and 20. The first leg member 12 further comprises a seat engagement portion 22 disposed substantially closer to the first end portion 18 than the second end portion 20. As best shown by FIGS. 9 and 10, the seat engagement portion 22 comprises an elongated cavity 24 having upper and lower surfaces 26 and 28 and first and second side surfaces 30 and 32. The seat engagement portion 22 further comprises first and second guide and retention members 34 and 36 formed in the upper and lower surfaces 26 and 28 of the elongated cavity 24, respectively.

The second leg member 14 comprises first and second end portions 40 and 42 and a seat engagement portion 44 disposed substantially closer to the first end portion 40 than the second end portion 42. The seat engagement portion 44 is identical to that of seat engagement portion 22 and comprises an elongated cavity 46 having upper and lower surfaces 48 and 50 and first and second side surfaces 52 and 54. The seat engagement portion 42 further comprises first and second guide and retention channels 56 and 58 formed in the upper and lower surfaces 48 and 50 the cavity 46, respectively. The first and second guide and retention channels 56 and 58 are aligned and disposed parallel to and between said first and second surfaces 52 and 54.

The seat member 16 comprises first and second end portions 60 and 62, an upper portion 64 and a lower portion 66. A cushion 68 may be disposed on the upper portion 64 as shown and/or the lower portion 66. Protrusions 70 are formed on the end portions 60 and 62 to receive tabs 76 extending from the cushion 68.

The seat member 16 further comprises first and second male connectors or plugs 80 and 82 removably and securely engageable with the seat engagement portions 22 and 44 of the first and second leg members, respectively. Plugs 80 and 82 comprise a hollow base portion 84 and hollow first and second fingers or walls 86 and 88 extending outward from the base portion 84. The plugs 80 and 82 further comprise first and second guide and retention members 90 and 92 protruding from opposite sides of the base portion 84 and disposed parallel to and between the first and second walls 86 and 88. The plugs 80 and 82 may further comprises a stop member 94 disposed at the end of each wall 86 and 88 to prevent the first and second leg member from becoming disengaged when the stop member 94 pass thru and clears the cavity 24 or 46 of the seat engagement portions 22 and 44 of the first and second leg members, respectively. Inward depression of the first and second walls 86 and 88 allows the seat member plugs 80 and 82 to removed from the seat engagement portions 24 and 44.

The first and second members 12 and 14 may further comprise one or more accessory attachment portions 100 adapted to receive a tool support member 102. The attachment portion 100 comprises a key-way 104 having an annular sidewall 105 adapted to securely receive a corresponding key portion 106 of the tool support member 102. The key portion 106 of the tool support member comprises an elongated body 108 having channels 110 and 112 adapted to engage with the annular sidewall of the key-way 104 upon insertion and rotation.

The first and second members 12 and 14 may further comprise a handle portion 120 that can grasped by the user. The handle portions 120 are disposed closer to end portions 20 and 42 and opposite the seat engagement members 22 and 24.

The first and second members 12 and 14 and the seat member 16 are hollow and made from plastic by conventional molding processes.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed:

1. A kneeler seat comprising:
    a first leg member comprising first and second end portions and a seat engagement portion disposed substantially closer to said first end portion than said second end portion; said seat engagement portion comprising an elongated cavity having upper and lower surfaces and first and second side surfaces; said seat engagement portion further comprises first and second guide and retention channels formed in said upper and lower surfaces of said elongated cavity, respectively;

a second leg member comprising first and second end portions and a seat engagement portion disposed substantially closer to said first end portion of said second leg member than said second end portion of said second leg member; said seat engagement portion of said second leg member comprising an elongated cavity having upper and lower surfaces and first and second side surfaces; said seat engagement portion of said second leg member further comprises first and second guide and retention channels formed in said upper and lower surfaces of said elongated cavity, respectively; said first and second guide and retention channels are aligned and disposed parallel to and between said first and second sidewalls; and a seat member having first and second plugs engageable with said seat engagement portions of said first and second leg members, respectively; each of said plugs comprises a base portion and first and second walls extending outward from said base portion; said first and second plugs further comprises first and second guide and retention member protruding from opposite sides of said base portion and disposed parallel to and between said first and second sidewalls; said first and second plugs further comprises a stop member to prevent disengagement from said first and second leg members.

* * * * *